US012303810B2

(12) United States Patent
Herczeg et al.

(10) Patent No.: US 12,303,810 B2
(45) Date of Patent: May 20, 2025

(54) SINGLE PASS CROSS FLOW FILTRATION MODULE AND METHOD

(71) Applicant: WaterSep BioSeparations LLC, Marlborough, MA (US)

(72) Inventors: Attila Herczeg, Southborough, MA (US); Bengt G. Persson, Boston, MA (US); Julie-Anne Burdick, Hudson, MA (US)

(73) Assignee: WaterSep BioSeparations LLC, Marlborough, MA (US)

( * ) Notice: Subject to any disclaimer, the term of this patent is extended or adjusted under 35 U.S.C. 154(b) by 347 days.

(21) Appl. No.: 16/033,126

(22) Filed: Jul. 11, 2018

(65) Prior Publication Data
US 2020/0016520 A1    Jan. 16, 2020

(51) Int. Cl.
*B01D 61/14*    (2006.01)
*B01D 29/90*    (2006.01)
(Continued)

(52) U.S. Cl.
CPC ......... *B01D 29/908* (2013.01); *B01D 61/145* (2013.01); *B01D 61/147* (2013.01);
(Continued)

(58) Field of Classification Search
CPC .. B01D 29/908; B01D 61/145; B01D 61/147; B01D 61/16; B01D 61/18; B01D 61/22;
(Continued)

(56) References Cited

U.S. PATENT DOCUMENTS 5,868,936 A * 2/1999 Ofsthun ............. B01D 67/0093
  210/651
7,384,549 B2 * 6/2008 de los Reyes ......... B01D 63/02
  210/321.72
(Continued)

FOREIGN PATENT DOCUMENTS

EP    2732863 A1    5/2014

OTHER PUBLICATIONS

GE Cross Flow Filtration Handbook, 2014.*
(Continued)

*Primary Examiner* — Patrick Orme
(74) *Attorney, Agent, or Firm* — Klarquist Sparkman, LLP

(57) ABSTRACT

Disclosed, herein is a single pass cross flow filtration system comprising: a filtration module, comprising two or more filtration segments fluidly connected in series, each having an upstream side and a downstream side; wherein each filtration segment comprises hollow fiber filter membranes, and wherein, when in use, the desired permeate flux is controlled by a configuration comprising: each filtration segment having a selected length; the hollow fiber filter membranes of each filtration segment, having a selected lumen diameter, wherein the selected inner diameter of each filtration segment may be the same or different, provided that at least one selected lumen diameter differs from another selected lumen diameter, and provided that the two or more filtration segments are arranged such that for a given filtration segment, having a selected lumen diameter, no filtration segment on the upstream side of the given filtration segment has a selected lumen diameter that is larger; and one or more pumps, mounted in the permeate channel.

20 Claims, 2 Drawing Sheets

(51) Int. Cl.
*B01D 61/22* (2006.01)
*B01D 63/02* (2006.01)
*B01D 63/06* (2006.01)

(52) U.S. Cl.
CPC .......... *B01D 61/22* (2013.01); *B01D 63/034* (2022.08); *B01D 63/069* (2022.08)

(58) Field of Classification Search
CPC ........ B01D 63/02; B01D 63/04; B01D 63/06; B01D 69/043; B01D 69/081; B01D 2311/04; B01D 2311/12; B01D 2311/16; B01D 2317/02; B01D 2317/022; B01D 2319/02; B01D 2325/02
See application file for complete search history.

(56) References Cited

U.S. PATENT DOCUMENTS

| | | |
|---|---|---|
| 8,388,847 B2 | 3/2013 | Mitterer et al. |
| 2014/0308409 A1* | 10/2014 | Savur .................... B01D 53/22 426/118 |
| 2015/0368602 A1 | 12/2015 | Galliher et al. |
| 2016/0058863 A1* | 3/2016 | Johnston .................. A61K 9/10 424/177.1 |
| 2017/0045483 A1* | 2/2017 | Shinkazh ............... G01N 30/42 |
| 2017/0095774 A1 | 4/2017 | de los Reyes |

OTHER PUBLICATIONS

GE Document CrossflowfiltrationMethodHandbook29-0850-76AB, retrieved Jun. 8, 2017.
GE Document: More options. Better results. An overview of filtration devices and systems Filtration Re-imagined Retrieved 2017-006-08.
Millipore white paper: Protein Concentration and Diafiltration by Tangential Flow Filtration Retrieved Sep. 4, 2017.
Liang S, Zhang H, Zhao Y, Song L (2016) Performance Modeling and Analysis of a Hollow Fiber Membrane System. J Membra Sci Technol 6: 144. doi:10.4172/2155-9589.1000144.
Chi Tien, et al., "Modeling the Performance of Cross-Flow Filtration Based on Particle Adhesion," Chem, Eng. Res. and Des., Accepterd paper, Accepted Aug. 9, 2016, retrieved Apr. 6, 2017.
Yu Wang, Kai & Matsuura, Takeshi & Chung, Tai-Shung & Fen Guo, Wei. (2004). The effects of flow angle and shear rate within the spinneret on the separation performance of poly(ethersulfone) (PES) ultrafiltration hollow fiber membranes. Journal of Membrane Science. 240. 67-79. 10.1016/j.memsci.2004.04.012.

* cited by examiner

SINGLE PASS CROSS FLOW FILTRATION MODULE AND METHOD

The present application for patent is in the field of filtration and, more specifically, in the field of cross flow filtration.

BACKGROUND

Biomanufacturing employs biological systems to produce commercially important biomaterials and biomolecules used in the fields of medicine, consumer goods and industrial processes. Illustrative examples of biomanufactured products include, but are not limited to, active pharmaceuticals; monoclonal antibodies; vaccines; proteins; amino acids; enzymes; animal cells, tissues and replacement organs; biofuels; biochemicals; and 'green' products to replace petroleum-derived chemicals. Regardless of scale, biomanufacturing generally uses fluid mixtures that require purification, which frequently involve one or more filtration steps.

Continuous biomanufacturing is gaining popularity as a more efficient way of producing solutions or suspensions of the target species. Of particular interest are "single pass" processes, wherein the retained materials or the filtered materials, as the case may be, are at or slightly above the desired concentration of the target solute after the first pass such that there is no need for recirculation and/or further purification.

Of particular interest are filtration systems having hollow-fiber membranes, in which the bulk fluid or feed flows across the surface of the membrane while a portion of feed material permeates through the membrane's pores. The fluid that passes through the membrane is referred to as permeate or filtrate, and the fluid retained by the membrane is referred to as retentate. Because the permeate flow is perpendicular to the bulk fluid flow, it is also referred to as cross flow filtration. There are two flow configurations for permeate through a hollow fiber membrane: flow from inside to outside the fibers or flow from outside to inside the fibers, so either the fiber's inner surface or outer surface can present as the filtration membrane.

Under certain conditions in cross flow filtration, the filtration process induces the creation of a concentrated layer or "boundary layer" of retained species on the surface of the membrane. This phenomenon is sometimes referred to as "concentration polarization," which may reduce the permeate flux relative to initial membrane conditions and is predictable in many cases. In the absence of counter measures, the accumulation of retained particles solutes or other species on the surface of the membrane results in decreased flux and if not corrected the filtering process may not function efficiently.

Various attempts have been made to effect single pass cross-flow filtration processes. For example, in US Pat. Appl. No. US 2017/0095774 A1, de los Reyes uses a module that comprises hollow fiber filtration materials having ultra-thin radii that are characterized by thicknesses of the same order of magnitude as the thickness of a boundary layer formed as the permeate flows through the membrane, leaving a concentrate at the boundary. These channels are said to have dimensions of from 50 μm (microns) to 150 μm (microns). Within the ultrathin channels, the concentrate is periodically flushed from the wall of the membrane by the application of a back pressure, applied from the permeate compartment. This allows collection of the concentrate. Accordingly, the system includes a module having a hollow fiber filtration membrane separating the module into a retentate compartment and a permeate compartment, a feed port fluidly coupled to a first end of the retentate compartment, a retentate port fluidly coupled to a second end of the retentate compartment, a permeate port fluidly coupled to the permeate compartment, a retentate valve coupled to the retentate port and a permeate pressurization valve coupled to the permeate port. The system further includes a cycle controller controllably connected to the retentate valve and the permeate pressurization valve. The cycle controller includes one or more of (a) a timing circuit to control the retentate valve, a load detector to control the retentate valve, or, a recovery detector to control the retentate valve, and (b) a permeate pressurization valve for applying the backpressure.

While the system disclosed supra, employs short channels, the requirement for a controller adds expense and unnecessary complexity and the back flushing step requires extensive experimentation to avoid clogging of the individual channels.

In another example, in U.S. Pat. No. 7,384,549, de los Reyes et al. disclose a single pass cross flow filtration system that includes a plurality of stages, each stage having a plurality of hollow fiber channels providing at least one serial flow path. In this system, each stage is in fluid communication with each adjacent stage preceding it and is in fluid communication with each adjacent stage that follows it. Each of the channels includes a hollow fiber filtration membrane and has a length, a membrane area, a void volume, a specific membrane area expressed as a ratio of the membrane area to the void volume, and a dimensionless length expressed as a product of the channel length and the specific membrane area. The dimensionless length of a stage is the sum of the dimensionless lengths of each channel in the longest serial flow path in the stage and the dimensionless length of the system is the sum of the dimensionless lengths of the stages. The specific membrane area of at least one channel in this system is greater than about 40 $cm^{-1}$ and the dimensionless length of the system is greater than about 2,000 and the dimensionless length of at least one of the of stages is less than about 6,000. Within each stage, two or more channels may be run in parallel. The inner diameter of the hollow fiber, called the "lumen" diameter is said to be decreased from stage to stage; thus increasing the possibility of clogging as a boundary layer builds up on the walls.

While the configuration, described supra, may be capable of separating components in a single pass, decreasing the lumen diameter downstream from stage to stage, as disclosed therein, will necessitate increasing the number of parallel fibers within a given stage in order to keep the pressure drop to manageable levels. This is especially true as viscosities increase at higher downstream concentrations. Moreover, as lumen diameters decrease from stage to stage, the formation of a boundary layer may clog the fiber; thus rendering the filter cartridge useless.

Therefore, there remains a need for a filtration system and method that provides single pass filtration, convenient flow rates and a simplified process. These needs are addressed by the system and method disclosed herein.

BRIEF DESCRIPTION OF THE DRAWINGS

FIG. 1(a) depicts a side view while FIG. 1(b) depicts a cross sectional view of the filtration segments depicted in FIG. 1(a).

The drawings are not necessarily to scale and no such intention should be inferred.

DETAILED DESCRIPTION OF THE DRAWINGS

Figure 1:
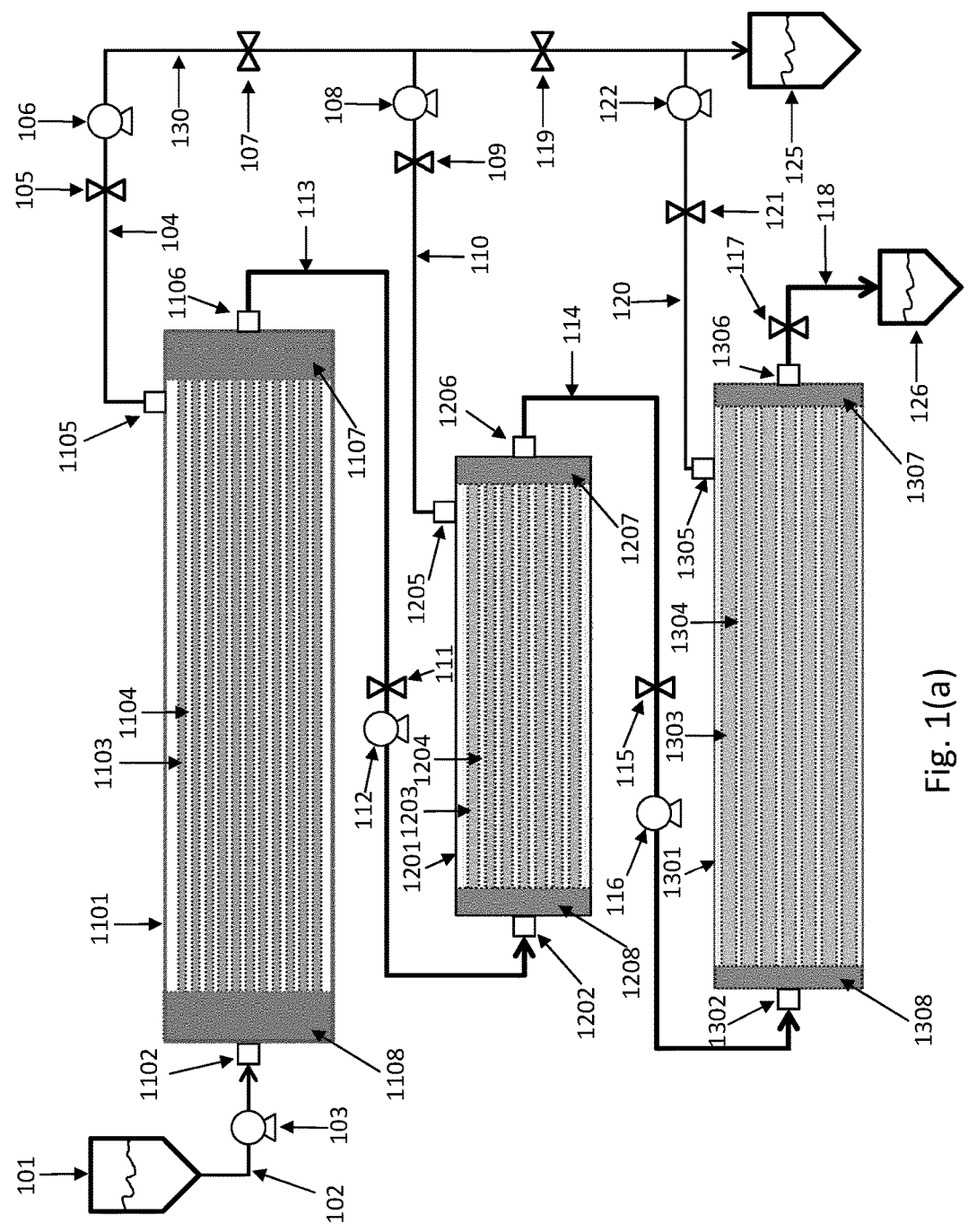
FIG. 1 depicts a schematic diagram of one embodiment of the cross flow filtration system having three filtration segments.

FIG. 1 depicts a schematic diagram of one embodiment of the cross flow filtration system having three filtration segments, wherein each filtration segment has an upstream side (left) and a downstream side (right). The three filtration segments are configured with fluid connections and fluid handling components according to the present description. Arrowheads in the fluid lines are intended to depict the usual direction of fluid flow. Fibers are depicted schematically; wherein such depiction is not intended to limit the number or configuration of the fibers within a filtration segment. For example, the fibers may be aligned in parallel as shown, randomly, in serpentine fashion, or otherwise coiled, twisted or bundled. Fluid lines may include control features such as pumps and/or valves. In addition, segments of fluid lines may be labeled for convenient reference.

Shown in FIG. 1(a) is a side view of one embodiment. A fluid reservoir 101, containing the fluid to be filtered may be fluidly connected by line 102 to a means for urging fluid through the line, such as pump 103, which, in turn, is fluidly connected at fluid connector 1102 to an internal manifold 1108 contained within the first filtration segment 1101. The manifold, 1108 distributes the fluid to the interior of the hollow fibers, illustrated by 1103 (dark areas). The interstices between and surrounding the hollow fibers 1104 (light areas) provide a space through which the permeate flows, eventually flowing out of the first filtration segment via fluid port 1105. The retentate flows out of a second manifold 1107 via a fluid port 1106. Not shown are potting materials used to mount hollow fibers within the housing of the filter segment.

The retentate from the first filtration segment 1101 is allowed to flow through fluid port 1106 to line 113, which may be regulated by valve 111, which valve, in normal operation, is at least partially open, and pump 112. Line 113 is shown fluidly connected at to an internal manifold 1208 contained within the second filtration segment 1201 via fluid port 1202. The manifold 1208 distributes the fluid to the interior of the hollow fibers, illustrated by 1203 (dark areas). The interstices between and surrounding the hollow fibers 1204 (light areas) provide a space through which the permeate flows, eventually flowing out of the second filtration segment via fluid port 1205. The retentate flows out of a second manifold 1207 via a fluid port 1206 and fluid line 114. It should be noted that, in this illustration, the inner (or lumen) diameters of the hollow fibers 1103 of the first filtration segment 1101 are smaller than the inner diameters of the hollow fibers 1203 of the second filtration segment 1201. Not shown are potting materials used to mount hollow fibers within the housing of the filter segment.

The retentate from the second filtration segment 1201 is allowed to flow through line 114, which may be regulated by pump 116 and valve 115, which valve, in normal operation, is at least partially open. Line 114 is fluidly connected at to an internal manifold 1308 contained within the third filtration segment 1301 via fluid connector 1302. The manifold 1308 distributes the fluid to the interior of the hollow fibers, illustrated by 1303 (dark areas). The interstices between and surrounding the hollow fibers 1304 (light areas) provide a space through which the permeate flows, eventually flowing out of the third filtration segment via fluid port 1305. The retentate flows out of a second manifold 1307 via a fluid port 1306. It should be noted that the inner (or lumen) diameters of the hollow fibers 1203 of the second filtration segment 1201 are depicted as being less than the inner diameters of the hollow fibers 1303 of the third filtration segment 1301. Not shown are potting materials used to mount hollow fibers within the housing of the filter segment.

The permeate exiting the first filtration segment 1101 via fluid port 1105 flows through line 104 which flow may be regulated by pump 106 and, optionally, valve 105, which valve, in normal operation, is at least partially open, to fluid line segment 130. The permeate exiting the second filtration segment 1201 via fluid port 1205 flows through line 110 which flow may be regulated by pump 108 and, optionally, valve 109, which valve, in normal operation, is at least partially open, to fluid line 130. The permeate exiting the third filtration segment 1301 via fluid port 1305 flows through line 120 which flow may be regulated by pump 122 and, optionally, valve 121, which valve, in normal operation, is at least partially open, to fluid line 130. Optional valves 105, 109, 121, 107, and 119, are at least partially open during normal operation. These valves may be useful for controlling forward flow or closing one or more of them may allow the application of back pressure to the filtration modules. The Pumps 106, 108, and 122 in permeate lines 104, 110, and 120, provide means for regulating permeate flow.

The filtered permeate enters line 130, regulated by valves 107 and 119. The fluid, thus released, is deposited in reservoir 125.

Further, in the example depicted in FIG. 1(a), the retentate exits the third filtration segment via fluid port 1306 through fluid line 118, which flow may be regulated by valve 117. The fluid thus released is deposited in reservoir 126.

FIG. 1(b) depicts cross sections of the three filtration segments 1101, 1201, and 1301. Without stating a preference for the canister diameter, canisters can come in various sizes and may be selected for the desired flow rates, filter capacities and membrane areas. In this embodiment, the inner or lumen diameters of the hollow fibers increase with each downstream filtration stage. Thus, the lumen diameters of the fibers in the first filtration stage 1103 are smaller than the lumen diameters of the fibers in the second filtration stage 1203 which, in turn, are smaller than the lumen diameters of the fibers in the third filtration stage 1303. The interstices 1104, 1204, and 1304 in the three stages 1101, 1201, and 1301 are also depicted in FIG. 1(b). Notwithstanding the foregoing, it is contemplated that the hollow fibers in any filtration segment n may have the same inner diameter as those in upstream filtration segment n−1, provided that no filtration segment contains fibers having larger inner diameters in an upstream filtration segment, and that n can be chosen so that at least one downstream filtration segment contains fibers having larger inner diameters than those in an upstream filtration segment.

Figure 2:
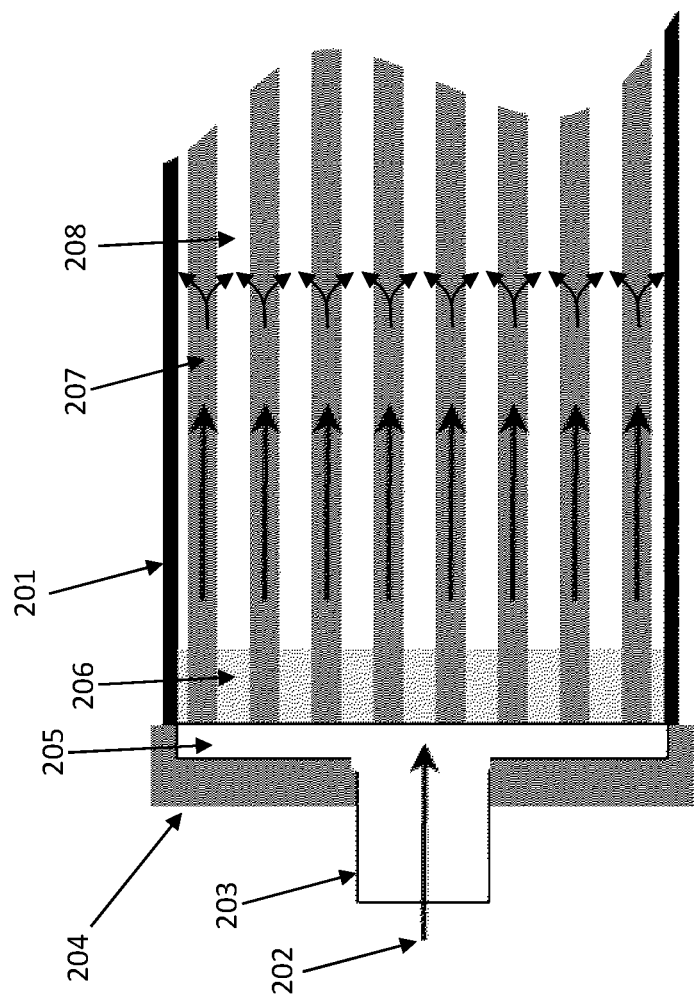
FIG. 2 depicts a schematic of a simple fluid distribution manifold within a filtration stage.

FIG. 2 depicts a schematic of a simple fluid distribution manifold within a filtration stage. In this non limiting example the body of the filtration stage 201 has been cut away to show the internal components. The fluid connector 203 admits fluid 202 to flow into a manifold 205, defined by a cap 204. The manifold 205 permits substantially equal distribution of fluid among all the semi-permeable hollow fibers, exemplified by 207. The hollow fibers 207 are held in place by the potting material 206, which provides a seal between the hollow fibers and the manifold and holds the hollow fibers in place within the filter housing. During filtration the fluid flows into the hollow fibers 207 and the permeate flows through the fiber membranes into the interstitial region 208 as illustrated. A similar structure is mounted at the other side of the filter stage, wherein the permeate flows out of a fluid port in the filter housing as shown in FIG. 1(a) and the retentate, combined from all the tubes flows into a similar manifold and out a fluid port.

More elaborate manifolds such as those known in the art can be used without departing from the scope of the claims appended hereto. For example, some manifolds fitted to cross flow filter cartridges permit series filtration through fibers within the same cartridge. In other embodiments, filtration segments may be mounted such that they are fluidly connected in parallel to form a compound filtration segment, n, may comprise fibers of the same inner diameter as those in upstream filtration segment n−1, provided that no filtration segment, compound or otherwise, contains fibers having larger inner diameters in an upstream filtration segment, compound or otherwise, and that n can be chosen so that at least one downstream filtration segment, compound or otherwise, contains fibers having larger inner diameters than those in an upstream filtration segment.

DETAILED DESCRIPTION

As used herein, the conjunction "and" is intended to be inclusive and the conjunction "or" is not intended to be exclusive unless otherwise indicated or required by context. For example, the phrase "or, alternatively" is intended to be exclusive. As used herein, it is intended that the terms "cross flow filtration" and "tangential flow filtration" are synonymous. As used herein, the term "exemplary" is intended to point to an example but is not intended to indicate preference. As used herein, the term "about" is understood as within a range of normal tolerance in the art, for example within 2 standard deviations of the mean. For example, the deviation from the nominal value modified by the term "about" may be due to limitations imposed by hardware such as fittings, mounting fixtures, securing structures and the like. "About" can further be understood as being within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." As used herein, a "filtration system" is understood to comprise one or more filtration modules and may further comprise pumps, valves and other ancillary equipment. As used herein, a "filtration module" is understood to comprise one, two or more filtration segments, fluidly connected as prescribed. As used herein, a "filtration segment" is understood to comprise a housing and one or more filter membranes. As used herein, a "compound filtration segment" is understood to comprise two or more filtration segments fluidly connected in parallel.

Disclosed herein is a single pass cross flow filtration system comprising: a filtration module; said filtration module comprising two or more filtration segments fluidly connected in series, each filtration segment having an upstream side and a downstream side; wherein each filtration segment comprises hollow fiber filter membranes, and wherein, when in use, the desired permeate flux (or flow) is controlled by a configuration comprising: (a) each filtration segment having a selected length; (b) the hollow fiber filter membranes of each filtration segment having a selected inner diameter; and (c) one or more pumps, mounted in the permeate channel; wherein the selected inner diameters may be the same or different, provided that at least one of the selected inner diameters differs from the others, and provided that the two or more filtration segments are arranged such that no inner diameter is larger on the upstream side.

Further disclosed herein is a method of single pass, cross-flow filtration, comprising: (a) providing a fluid to be filtered; (b) providing a filtration module, said filtration module comprising two or more filtration segments fluidly connected in series, each filtration segment having an upstream side and a downstream side; wherein each filtration segment comprises hollow fiber filter membranes; (c) adjusting the permeate flux (or flow) to reach a desired value by providing a configuration of components, said configuration of components comprising: one or more filtration segments, each having a selected length; or one or more hollow fiber filter membranes in each filtration segment, said hollow fiber filter membranes having selected inner diameters, wherein the selected inner diameters in each of the one or more filtration segments may be the same or different, provided that at least one of the selected inner diameters differs from the others, and provided that the two or more filtration segments are arranged such that no inner diameter is larger on the upstream side of any filtration segment; and one or more pumps, mounted in the permeate channel; and (d) filtering a fluid mixture through the filter module to obtain a retentate and a permeate.

Still further disclosed herein is a method of single pass, cross-flow filtration, comprising: (a) providing a fluid to be filtered; (b) providing a filtration module, said filtration module comprising two or more filtration segments fluidly connected in series, each filtration segment having an upstream side and a downstream side; wherein each filtration segment comprises hollow fiber filter membranes; (c) adjusting the permeate flux (or flow) to reach a desired value by providing a configuration of components, said configuration of components comprising: one or more filtration segments. each having a selected length; or one or more filtration segments, each said filtration segment comprising hollow fiber filter membranes having a selected inner diameter; wherein at least one of the selected inner diameters differs from the others; and wherein the one or more filtration segments are arranged such that no inner diameter is larger on the upstream side of any filtration segment; and one or more pumps, mounted in the permeate channel; and filtering a fluid mixture through the filter module to obtain a retentate and a permeate.

Further disclosed herein is a filtration system comprising: a plurality of stages, each stage having a plurality of hollow fiber filter membranes, providing at least one serial flow path, each stage being in fluid communication with each adjacent stage preceding it and being in fluid communication with any adjacent stage that follows it, the improvement comprising: means for controlling permeate flux.

As will become evident, various modifications and enhancements of the above embodiments are within the scope of the subject matter disclosed and claimed herein.

Hollow fiber membranes often enable tangential flow filtration where the bulk fluid or "feed" flows across the surface of the membrane while the ingredients being filtered permeate through the membrane's pores. Closing off the hollow fiber at one end results in what is known as "dead-end" filtration. Under such conditions, the ability to sustain tangential flow may be limited. The fluid passing through the membrane is referred to as the permeate or the filtrate, while the fluid passing over the membrane without passing through it is referred to as the retentate or the concentrate. Because the permeate flow is approximately perpendicular to the bulk fluid flow through the fibers, it is also referred to as cross flow filtration. There are two flow configurations for permeate through a hollow fiber membrane: flow from inside to outside the fibers or flow from outside to inside the fibers; the filtration membrane may enable flow in both directions.

The pores in the semi-permeable hollow fiber membrane can range from approximately 0.001 to 100 micrometers. Further, there are various categories of membrane, depending on the average pore size: microfiltration and ultrafiltration. Microfiltration membranes have pores ranging from approximately 0.1 micrometers to 100 micrometers, while an ultrafiltration membrane has pores ranging from approximately 1 nanometers to 0.1 micrometers. Such a membrane may also be expressed by its ability to fractionate proteins, nucleic acids and other polymers by size. For example, an ultra-filtration membrane may have a molecular weight cutoff (MWCO) range from 1,000 to 1,000,000 Daltons, pertaining to the approximate molecular weight of the polymer retained by the ultra-filtration membrane.

Suitable materials of construction for hollow fiber filter membranes include, without limitation, hydrophobic materials, hydrophilic materials and amphiphilic materials. In addition, some materials, such as polyamides may display bulk hydrophilic properties and surface hydrophobic properties. Without intending to be bound by theory, the degree of hydrophobicity or hydrophilicity may permit wicking of the carrying solvent through the pores of the filter membrane; thus influencing selectivity, and/or non-specific or amphiphilic binding of the molecules to the membrane.

More specifically, materials of construction may be organic or inorganic with inorganic ceramic filters useful where filtration at extreme temperatures is carried out. Organic materials, such as polymers, may be used at moderate temperatures of about −100° C. to about 300° C. in some cases, although certain organic polymers may be suitable for higher temperature use. Hydrophobic materials of construction include, without limitation, polysulfone, polyethersulfone, polypropylene, polyethylene, polyvinylidene fluoride, hydrophobic poly tetrafluoroethylene (PTFE), hydrophobic polyamides and the like. Hydrophilic materials of construction include, without limitation, polylactic acid and analogous polymerized hydroxy acids, cellulose acetate, mixed cellulose esters, hydrophilic polyamides, and the like. The monomer repeat units of the foregoing polymers may be used in copolymers to adjust polymer physical properties, and to obtain the desired levels of hydrophobicity and hydrophilicity. Such amphiphilic materials may provide the opportunity for greater selectivity. In addition, amphiphilic materials may provide self-organizing properties. For example, it is known that certain block copolymers comprising two or more monomer units that are insoluble in one another can undergo self organization, wherein blocks comprising the monomer units separate from one another and form domains. Such self organized materials are another example of amphiphilic materials. It is further understood that certain of the foregoing polymers may display interesting electrical properties. For example, polyamides, such as the odd nylons, and polyvinylidine fluoride are ferroelectric materials. Such properties may also be useful in filtration applications.

Filter pore structures vary widely. While no limitation is intended, several examples are provided herein. In some applications, it may be advantageous to employ a filter having track-etched pores, which may be formed using some form of radiation such as alpha particles. Track-etched pores have approximately columnar or branched columnar structures. In other applications, filter pores having a fused network structure may be appropriate. Still other applications may benefit from using fibrous pore structures. In other applications, pores may comprise cells or chambers with openings in their walls that allow a fluid to flow between them. It is further understood that the structure of the pores is also influenced by the pressure drop across the membrane.

Bundles of hollow fiber membranes, usually having similar diameter and pore size, may be sealed in potting material such that, when in use, the interiors of the fibers are accessible to a fluid manifold without contaminating the permeate on the outsides of the fibers, as shown illustratively in FIG. 2. Suitable potting materials include, without limitation, heat and light curable resin formulations, other room temperature curable resin formulations, polymer melts, fusible powders and other encapsulants. Exemplary potting materials include, without limitation, epoxy resins, urethane resins, aminoplast and amidoplast resins, alone or mixed with phenolic or other suitable resins, silicone resins, heat or ultraviolet curable (meth)acrylic resins, polyester resins and hot melt waxes and resins.

Filtration segments may be modular cartridges wherein the hollow fiber membranes are enclosed in a self-contained module, as depicted schematically in FIG. 1(a). Depending on the required capacity, filtration segments may be arranged and fluidly connected in parallel or in series. The filter membrane surface area available for filtration in the cartridge can be calculated by multiplying the surface area of each fiber by the number of fibers sealed the cartridge housing by the length of fiber flow path.

Depending on requirements, filter segments may be arranged in series or in parallel. The parallel arrangement provides a convenient way to add membrane surface area by adding filtration segments, rather than using larger filtration segments having more fibers. The series arrangement of filtration segments allows staged filtration with less buildup of solute or gel layer at the filter wall.

The hollow fiber membrane's pores allow biomanufacturing ingredients to be separated from the bulk fluid mixture. A biomanufacturing ingredient is a component of the mixture which can be purified or separated by semipermeable membrane filtration. These ingredients include, but are not limited to, biomanufactured products, solutes, buffers, and contaminants. The biomanufactured product is the molecule of interest and is separated from the other biomanufacturing ingredients by the filter membrane. Separation of the product from the fluid mixture can occur by choosing a membrane to retain the product while allowing other ingredients to pass through. Alternatively, the membrane may be chosen to allow the product to permeate through the membrane while retaining the higher molecular weight ingredients, such as aggregates or contaminants larger than the fiber pore size, to be in the retentate.

Without limitation, materials to be filtered may include ionic materials such as salts, acids bases and buffers, amphoteric materials, zwitterions, organic solvents, water, ionic solvents, microcrystals, latex particles, cross-linked polymers, polymers physically associated into aggregates, chemically or physically linked polymer microgels, aggregates of highly cross-linked polymers, emulsified particles, clumps of associating proteins, microbes, cellulosic debris, latex and emulsion particles, clusters and fibers comprising of biological cells and fibers, cell organelle fragments, incompletely dissolved polymers, proteinaceous particles, cellulosic and other polysaccharide particles, flocculating particles, precipitating particles, phase separating liquid systems, salt crystals, particles due to oxidation or reduction processes, pyrogens, cell debris, cell suspensions, food products, particles emanating from the reaction or process vessel itself, and, aggregated therapeutic proteins.

The inner diameters of the hollow fibers, often referred to as the "lumen diameters" may be of any size, and no size limitation is intended. Notwithstanding, it is frequently convenient to select from among commercially available options. Small sized fibers provide higher surface to volume ratios at the possible expense of higher shear rates, increased pressure drops, which, in turn, may affect pump selection and the ability to effect filtration, and slower axial velocity, depending on the fluid viscosity, solids load, and propensity to form gel layers. Fibers having higher inner diameters may allow for faster axial velocity at lower surface to volume ratios. Inner diameters may range from about 0.1 mm to about 3.0 mm. Within this range, hollow fiber filter membranes may have inner diameters between about 0.5 mm to about 2.0 mm. In particular, inner diameters may be selected from about 0.5 mm, about 0.63 mm, about 0.7 mm, about 0.75 mm, about 1.0 mm, about 1.4 mm, or about 1.9 mm.

The nominal lengths of the hollow fibers may be of any size, and no size limitation is intended. Notwithstanding, it is frequently convenient to select from among commercially available options. Accordingly, lengths of fibers may vary from their nominal values by as much as 2 cm, depending on the configuration of the filtration segment housing and the potting material. Shorter length fibers allow lower inlet pressures to achieve the same axial velocity as compared to longer fibers of the same inner diameter at the possible expense of filtration efficiency. Longer fibers may offer higher filtration efficiency but may require higher inlet pressure and fluids flowing through them will undergo greater pressure drops and higher shear rates than those flowing through shorter fibers having the same inner diameter. When fibers are arranged linearly and approximately in parallel, their lengths will correspond to the length of the filter segment. Fiber lengths may range from about 12.5 cm to about 150 cm. Within this range, hollow fiber filter membranes may be about 20 cm to about 120 cm long. In particular, fiber lengths may be selected from about 30.5 cm (12 in.), about 61 cm (24 in.), or about 104.1 cm (41 in.). Longer filtration channels may be obtained by arranging two or more filter segments such that the retentate channel of one filter segment is fluidly coupled to the input channel of another filter mounted downstream. In this way, longer filtration paths can be achieved using readily available filter components.

Notwithstanding the foregoing, fibers may also reside in flexible housings wherein coiled fibers are mounted. In such a system fibers would be coiled in "corkscrew" fashion, such that they may be longer than the filter housing.

Within this range, such housing may have lengths between about 13 cm (5 in.) and 127 cm (50 in). In particular. Filter segment housings may be selected from about 30.5 cm (12 in.), about 61 cm (24 in.), or about 104.1 cm (41 in.). Longer filtration channels may be obtained by arranging two or more filter segments such that the retentate channel of one filter segment is fluidly coupled to the input channel of another filter mounted downstream. In this way, longer filtration paths can be achieved using readily available filter components. Filter modules of higher capacity may be obtained by fluidly coupling multiple filtration segments in parallel, with the inputs supplied by the same feed.

Within a filtration segment, there may be any number of hollow fiber filter membranes and no numerical limitation is intended. Notwithstanding, it is frequently convenient to select from among commercially available options. Accordingly, a filter segment may have from 1 to about 100,000 hollow fiber membranes, depending on the diameter of the fiber and the dimensions of the filter housing. For example, a 15.2 cm (about 6 inch) inner diameter filter segment housing may have 50,000 or more 0.25 mm hollow fiber membranes within it.

Precision pumps such as metering pumps move a precise volume of liquid in a specified period of time; thus providing an accurate flow rate. In this way, pressure may be applied to assist in regulating permeate flow. As an example, such pumps 106, 108, and 122 may be placed in the permeate lines as shown in FIG. 1(a). Without limitation, pumps may include reciprocating piston pumps, syringe pumps, rotational pumps, gear pumps, peristaltic pumps, diaphragm pumps or the like. Drive motors on the pumps may include electronically driven motors such as stepper motors, pneumatic motors, electric motors or the like. Moreover, the motor may act as a sensor to indicate the level of resistance imposed by the filtration system. For example the drive current of the motor can be monitored to indicate how much work is being done to maintain a given level of permeate flux.

In addition to pumps, pressure sensors and flow meters may be employed to monitor conditions and maintain process control. Pressure sensors may include, without limitation, diaphragm pressure gauges, capacitive pressure sensors, electromagnetic inductance pressure sensors, piezoelectric, pressure sensors, piezoeresistive, pressure sensors, optical pressure sensors potentiometric pressure sensors, MEMS pressure sensors or the like. Flow meters may include, without limitation, mechanical flow meters or electronic flow meters. Mechanical devices include, without limitation, radial turbines, propeller-type turbines, vane type instruments, linear resistance meters, vortex flow meters and the like. Electronic flow meters include, without limitation, ultrasonic Doppler anemometers, laser Doppler anemometers, magnetic flow meters, Coriolis flow meters, and the like. It may be convenient to use different flow and pressure sensing devices when liquids or gases are being processed.

Control of the trans-membrane pressure may be manual or it may be accomplished by electronic control. Manual controls may provide electrical or mechanical engagement such that the pump motors are switched on and off to hold a preset permeate flux tolerance. Simple manual controls may include pinch clamps, switches, capacitive devices or other ways of achieving electrical engagement. In addition, the controller may comprise a logic circuit or a computing device such as a processor, operatively coupled to the controls as well as to sensors, actuators and the like. Actuators, may be employed to engage automatically to control pumps and valves.

Processors may comprise any circuit for performing data processing, including digital signal processors, single processors, parallel processors, analog processors, memory management processors, optical processors, equivalents thereof and combinations thereof. In addition, processors may include auxiliary circuits, either integrated with the processor or in separate devices operating with the processor. Auxiliary circuits may be any circuit that provides an additional function on behalf of the processors and can be shared between two or more processors. Auxiliary circuits may include memories such as semiconductor memories, magnetoresistive memories, disk memories, flash memories, or any equivalent means for storing data. Auxiliary circuits and logic devices may comprise gate arrays, adders, other programmed logic circuits, amplifiers, triggers, A/D converters, D/A converters, optical interfaces, serial and parallel interfaces, buffers, masking circuits, encryption circuits, direct memory access circuits, equivalents thereof or combinations thereof.

Program logic may comprise computer programs written in any known language, such as C, C++, Pearl, Fortran, Basic, Pascal, assembly language, machine language, equivalents thereof or combinations thereof. Program logic may further comprise parallel processing logic for employing multiple processors or processor cores, direct memory access logic for continual monitoring functionality, masked direct memory access, interrupt routines, interrupt service routines, equivalents thereof or combinations thereof.

Table lookup logic may comprise interpolation and extrapolation routines, based on polynomials, spline functions, rational functions, normalized spectral elements, equivalents thereof or combinations thereof. Further, table lookup logic may comprise ordered table searching, searching with correlated values, estimation by neural networks, multidimensional estimation, equivalents thereof or combinations thereof. Data for table lookup may be obtained experimentally.

The processor may gather data using various sensors and other devices, such as pressure sensors, flow sensors, accelerometers, actuators and the like. By monitoring the various inputs, the permeate flux may be adjusted continually in each permeate channel.

Pressure sensors may comprise piezoelectric sensors, piezoresistive sensors, capacitive sensors, which may comprise foams or other elastic materials as well as ceramics and fluids, electromagnetic sensors, in which the physical displacement of a diaphragm or cantilever causes changes in inductance, reluctance or capacitance, a linear variable differential transformer device, Hall effect devices, equivalents thereof or combinations thereof.

Some fluids such as those that contain monoclonal antibodies may exhibit exceptionally high viscosity. Under some circumstances, viscosity lowering excipients may be used. Such materials have a wide range of biophysical-chemical properties. They may modify viscosity, aggregation propensity, or stability. Such excipients include amino acids or their salt forms such as alanine, proline, valine, glycine, serine, histidine (HCl), lysine (HCl), arginine (HCl), and sodium glutamate. In addition, pharmaceutically acceptable salts may be used such as NaCl, NaOAc, Na2SO4, and NH4Cl. In some embodiments, chaotropic reagents such as urea, imidazole, betaine, or guanidinium chloride may be used. It is understood that the organic materials listed herein as excipients may be employed as salts or as their parent compounds. Suitable pharmaceutically acceptable salts include acid addition salts which may, for example, be formed by reacting a compound of interest with a suitable pharmaceutically acceptable acid such as hydrochloric acid, sulfuric acid, fumaric acid, maleic acid, succinic acid, acetic acid, benzoic acid, citric acid, tartaric acid, carbonic acid or phosphoric acid.

Parameters such as axial velocity, shear rate and its associated shear stress, axial pressure drops and trans-membrane pressure drops are of operating significance because of the sensitivities of the target materials to mechanical and fluid mechanical factors. For example, using too high a linear axial velocity may result in a precipitate that is too finely divided because of too high a shear rate. This is of relevance in purifications of plasmid DNA; wherein it is desirable to keep the genomic DNA concentration as low as possible in the separated plasmid DNA sample.

As another example, certain biopolymers such as plasma proteins are sensitive to shear rate; which sensitivity has physiological significance. Of such proteins, one example, the von Willebrand factor (VWF), may undergo unfolding at high shear. The unfolded VWF adheres to substrates such as collagen and provides a template for platelet adhesion and eventual clotting of blood. In small blood vessels, an opening such as a wound may result in a high shear situation which, in turn triggers unfolding of VWF and the subsequent clotting response. Within a hollow fiber filter, high velocities may give rise to shear rates that may denature VWF or similar materials. Filtration of folded VWF without damaging it may be accomplished by maintaining the shear rate below 2300 sec$^{-1}$, below 2000 sec$^{-1}$, or below 1800 sec$^{-1}$.

During the filtration process, a concentrate may form on the walls. Concentrates may increase in viscosity, often according to a power law or other function such as a polynomial or supralinear function of concentration. The nature of the function will depend on the particular intermolecular interactions between solvent molecules, solvent and solute molecules, and solute molecules interacting with each other. In one embodiment, the concentration may be collected in the course of uninterrupted flow. Alternatively or in combination, the concentrate may be collected by periodically flushing it from the walls of the membranes, using a back pressure, applied from the permeate compartment by operating the pump(s) in reverse or the feed compartment by operating the feed pumps in reverse, as appropriate, or by closing off the permeate flow in a frequency to ensure some of the concentrate is going back into the bulk flow. Further flushing with buffer solution may also serve to dilute the concentrate sufficiently to allow collection. Within certain limits, it may be possible to promote collection of the concentrate by increasing temperature, although care should be taken to avoid temperature induced denaturation.

Filtration segments may be prepared as custom units or be purchased as commercially available units. The filtration segment comprises a filter housing, as shown in FIG. 2, having an inner diameter. The filtration segment inner diameter refers to the inner diameter or equivalent inner dimension of the filter housing, wherein the hollow fibers reside. No limitation is implied on a filtration segment inner diameter. Notwithstanding, aqueous filters for biological systems, for example, may be conveniently chosen to have filtration segment inner diameters between about 0.5 cm and about 26 cm. As a further example, filtration segment inner diameters may be chosen to be between about 0.95 cm and about 16 cm.

For a given filtration segment, the shear rate of a Newtonian fluid within the hollow fiber filter membrane may be approximated by $$\dot{\gamma} = \frac{169766 \cdot Q}{N_f d^3}$$

where $\dot{\gamma}$ is shear rate, Q represents the flow rate of the feed in liters/min, $N_f$ is the number of fibers in the filtration segment and d is the inner diameter of the fibers in mm. The constant, 169,766, may be regarded as a suitable first approximation but may be refined using empirical data for a given system. The resulting stress attributable to the shear rate is given by $$\tau_w = \dot{\gamma}\mu$$

where $\tau_w$ represents the shear stress, and $\mu$ represents the dynamic viscosity of the fluid in the retentate channel.

Further, within a given filter segment, the axial velocity, $u_x$, for a Newtonian fluid may be modeled by the following:

$$u_x = \frac{21.22 \cdot Q}{d^2 \, N_f}$$

wherein the variables are as defined, supra. As above, the constant, 21.22 may serve as a reasonable first approximation, which may be refined using experimental data. Alternatively, $u_x$ may be measured empirically using Doppler ultrasound measurements if the lumen diameter is sufficiently large.

Further, within a given filter segment, the pressure drop across that segment may be approximated by $$\Delta P = \frac{101130 \cdot \mu \, l_f \, Q}{N_f \, d^4}$$

wherein the constant, 101,130, may be used as a reasonable first approximation. Actual measurements of pressure drop are accomplished with monometers or other pressure meters at the entrance and exit ports of a filtration stage. Continual collection of pressure drop data may allow for adjustment of the constant as filtration proceeds.

The permeate flux or flow velocity depends on fluid parameters such as viscosity, solids loading and the propensity to form gel layers. Accordingly, a priori calculations of the permeate flux may result in estimated values having some level of error. Notwithstanding, control of the permeate flux can be accomplished by varying other factors, such as fiber membrane inner diameter, pore size, pore density at the membrane surface, resistance to flow by membrane pore density, and variation of the trans-membrane pressure. The flux may then be monitored empirically. The trans-membrane fluid velocity, v is related to the permeate flux, J in the following way:

$$v = J \cdot A = \frac{\Delta P_{TM} \, A \, N_f}{(R_m + R_c) \, \mu} = \frac{\Delta P_{TM} \, \pi \, d^2 \, l_f \, N_f}{4 \, (R_m + R_c) \, \mu}$$

where $\Delta P_{TM}$ represents the trans-membrane pressure, A is the inner area of the hollow fiber, $R_m$ and $R_c$ represent the resistances of the membrane and "cake", respectively, and the other variables are as defined supra. It should be noted that the "cake" resistance $R_c$, may represent resistance due to the buildup of solid matter on the inner fiber wall, a gel built up on the inner fiber wall, or both.

In the any of the foregoing equations, the functions shown are not intended to be limiting but may take a variety of reasonable forms, particularly if adjustable parameters obtained from a fit or estimation technique are used. For example, the function $(R_m + R_c)$ may be interpolated and/or extrapolated using polynomials, spline functions, rational functions, normalized spectral elements and equivalents thereof or combinations thereof. Further, fitting techniques may include, without limitation, table lookup logic, which may comprise ordered table searching, or searching with correlated values, estimation by linear and nonlinear least squares, as appropriate, neural networks, geometric estimation, Monte Carlo estimation, multidimensional estimation, equivalents thereof or combinations thereof. Phenomenological constants or other fit estimates may be obtained especially for the configuration in question or they may be assembled from libraries comprising parameters obtained in previous calculations.

Control of permeate flux may be accomplished by arranging the filtration module as described supra. In particular, two or more filtration segments are arranged as in FIG. 1(a) and FIG. 1(b) that filtration segments having larger fiber inner diameters are downstream of another filtration segment having smaller inner diameter fibers. When in use, the filtration module is monitored by pressure sensors, flow sensors and the like and the trans-membrane pressure, $P_{TM}$ is controlled by applying pumps such as 106, 108, and 122, as illustrated in FIG. 1(a). These pumps may be controlled together or, in another embodiment, separately to control the permeate channel from each filtration segment.

Although the present invention has been shown and described with reference to particular examples, various changes and modifications which are obvious to persons skilled in the art to which the invention pertains are deemed to lie within the spirit, scope and contemplation of the subject matter set forth in the appended claims.

What is claimed is:

1. A single pass cross flow filtration system for a viscous liquid comprising biopolymers sensitive to shear rate through controlling a permeate flux, comprising:
    a fluid reservoir fluidly connected to a means for urging fluid to a first filtration segment of a filtration module, the filtration module comprising two or more filtration segments fluidly connected in series, each having an upstream side and a downstream side, and each having a retentate channel and a permeate channel;
    at least one pump and at least one valve in the retentate channel between respective ones of the two or more filtration segments;
    at least one pump mounted in the permeate channel of each of the two or more filtrations segments, and
    a fluid line segment for exiting permeate from all permeate channels to a reservoir for deposition, the fluid line segment comprising at least one valve positioned between the entries of permeate channels of two filtration segments,
    wherein each filtration segment has a selected length and comprises hollow fiber filter membranes, the hollow fiber filter membranes of each filtration segment having a selected lumen diameter,
    wherein at least one selected lumen diameter differs from another selected lumen diameter, and provided that the two or more filtration segments are arranged such that for a given filtration segment having a selected lumen diameter, no filtration segment on the upstream side of the given filtration segment has a selected lumen diameter that is larger,
    wherein the at least one pump and the at least one valve in the respective retentate channel are positioned between filtration segments with the differing lumen diameters, thereby regulating the flow of retentate from the segment on the upstream side into the segment on the downstream side, and
    wherein the means for urging fluid to the first filtration segment, all pumps mounted in the permeate channel of each of the two or more filtration segments, and the at least one valve in the fluid line segment for exiting permeate are controlled by a processor to control the permeate flux in the permeate channels of the two or more filtration segments.

2. The single pass cross flow filtration system of claim 1, wherein the selected lengths of the two or more filtration segments are from about 12.5 cm to about 800 cm.

3. The single pass cross flow filtration system of claim 1, wherein the selected lengths of the two or more filtration segments are chosen from about 30.5 cm, about 61 cm, and about 104 cm.

4. The single pass cross flow filtration system of claim 1, wherein the two or more filtration segments each have a filtration segment housing inner diameter, and wherein each filtration segment housing inner diameter is chosen from about 0.5 cm to about 26 cm.

5. The single pass cross flow filtration system of claim 1, wherein the two or more filtration segments each have a filtration segment housing inner diameter, and wherein each filtration segment housing inner diameter is chosen from about 0.95 cm to about 16 cm.

6. The single pass cross flow filtration system of claim 1, wherein the selected lumen diameters are about 0.1 mm to about 5.0 mm.

7. The single pass cross flow filtration system of claim 1 wherein the hollow fiber filter membranes have pore sizes from about 1 nanometers to about 500 micrometers.

8. The single pass cross flow filtration system of claim 1, wherein the at least one pump mounted in the permeate channel of each of the two or more filtration segments is configured to provide a back pressure in the permeate channel.

9. The single pass cross flow filtration system of claim 1, wherein for each filtration segment that is located on a downstream side of an upstream filtration segment of the two or more filtration segments, the selected lumen diameter of the filtration segment on the downstream side is larger than the selected lumen diameter of the upstream filtration segment.

10. A method of single pass cross-flow filtration of a viscous liquid comprising biopolymers sensitive to shear rate for controlling permeate flux, comprising:
  a. providing a fluid to be filtered;
  b. providing a fluid reservoir containing the fluid to be filtered, the fluid reservoir being fluidly connected to a means for urging fluid to a first filtration segment of a filtration module;
  c. the filtration module comprising two or more filtration segments fluidly connected in series, each filtration segment having an upstream side and a downstream side, and each having a retentate channel and a permeate channel; wherein each filtration segment comprises hollow fiber filter membranes;
  d. adjusting the permeate flux to reach desired values of axial velocity, shear rate and its associated shear stress, axial pressure drops and transmembrane pressure drops by providing a configuration of components, the configuration of components comprising:
    i. two or more filtration segments, each of the two or more filtration segments having a selected length;
    ii. one or more hollow fiber filter membranes in each filtration segment, the one or more hollow fiber filter membranes having a selected lumen diameter, wherein at least one of the selected lumen diameters differs from the others, and provided that the two or more filtration segments are arranged such that for a given filtration segment having a selected lumen diameter, no filtration segment on the upstream side of the given filtration segment has a selected lumen diameter that is larger;
    iii. at least one pump and at least one valve in the retentate channel of respective ones of the two or more filtration segments, the at least one pump and the at least one valve being positioned between two filtration segments with the differing lumen diameters;
    iv. at least one pump mounted in the permeate channel of each of the two or more filtration segments;
    v. a fluid line segment for exiting permeate from all permeate channels to a reservoir for depositing, which comprises at least one valve positioned between the entries of permeate channels of two filtrations segments and
  e. filtering a fluid mixture through the filtration module to obtain a retentate and a permeate,
  wherein the means for urging the fluid to the first filtration segment, all pumps mounted in the permeate channel of each of the two or more filtration segments, and the at least one valve in the fluid line segment for exiting permeate are controlled by a processor to control the permeate flux in the permeate channels of the two or more filtration segments.

11. The method of claim 10, wherein the selected lengths of each of the two or more filtration segments is chosen to be from about 4 inches to about 100 inches.

12. The method of claim 10, wherein the selected lengths of the two or more filtration segments are chosen from about 12 inches, about 24 inches, and about 41 inches.

13. The method of claim 10, wherein the two or more filtration segments each have a filtration segment housing inner diameter, and wherein each filtration segment housing inner diameter is chosen from about 0.5 cm to about 26 cm.

14. The method of claim 10, wherein the selected lumen diameters are about 0.1 mm to about 5 mm.

15. The method of claim 10, wherein the fluid to be filtered comprises a viscosity lowering agent chosen from proline, histidine, lysine, arginine, glutamic acid, betaine, glutamine, asparagine, imidazole and salts thereof.

16. The method of claim 10 wherein the hollow fiber filter membranes have pore sizes from about 10 nanometers to about 500 micrometers.

17. The method of claim 10, further comprising operating the at least one pump mounted in the permeate channel of each of the two or more filtration segments to provide a back pressure in the permeate channel.

18. The method of claim 17, further comprising periodically restricting the flow of the permeate by closing off the permeate channel.

19. The method of claim 10, wherein for each filtration segment that is located on a downstream side of an upstream filtration segment of the two or more filtration segments, the selected lumen diameter of the filtration segment on the downstream side is larger than the selected lumen diameter of the upstream filtration segment.

20. The method of claim 10, wherein the shear rate within the one or more hollow fiber filter is maintained below 2300 $\sec^{-1}$.

* * * * *